United States Patent
Ha et al.

(10) Patent No.: US 10,245,529 B2
(45) Date of Patent: Apr. 2, 2019

(54) SYSTEM AND APPARATUS TO IMPROVE VENTING AND SPILL MITIGATION FOR TANK

(71) Applicant: GM GLOBAL TECHNOLOGY OPERATIONS LLC, Detroit, MI (US)

(72) Inventors: Wing-Fai Ha, Markham (CA); Martin Juhas, Ottawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 45 days.

(21) Appl. No.: 15/443,588

(22) Filed: Feb. 27, 2017

(65) Prior Publication Data

US 2018/0243667 A1   Aug. 30, 2018

(51) Int. Cl.
- *B01D 53/00* (2006.01)
- *B01D 19/00* (2006.01)
- *F01N 3/28* (2006.01)
- *F01N 3/20* (2006.01)

(52) U.S. Cl.
CPC ....... *B01D 19/0031* (2013.01); *F01N 3/2066* (2013.01); *F01N 3/28* (2013.01); *F01N 2610/02* (2013.01); *F01N 2610/1406* (2013.01); *F01N 2610/1413* (2013.01); *F01N 2610/1466* (2013.01); *Y02T 10/24* (2013.01)

(58) Field of Classification Search
CPC ..... F01N 2610/1406; F01N 2610/1466; F01N 2610/142; F01N 3/28; F01N 2610/1413; B01D 19/0031
See application file for complete search history.

(56) References Cited

U.S. PATENT DOCUMENTS

| | | | | | |
|---|---|---|---|---|---|
| 1,434,025 | A | * | 10/1922 | Reichhelm | F02M 31/18 48/107 |
| 1,740,240 | A | * | 12/1929 | Honey | A61N 1/306 604/114 |
| 2,596,744 | A | * | 5/1952 | Vonnegut | G01N 7/10 427/102 |
| 5,000,919 | A | * | 3/1991 | Heckmann | G01N 31/223 422/401 |
| 5,919,357 | A | * | 7/1999 | Wilkins | C02F 1/008 210/120 |
| 6,142,707 | A | * | 11/2000 | Bass | E21B 17/015 405/158 |
| 6,159,288 | A | * | 12/2000 | Satou | B05C 11/08 118/52 |
| 9,636,998 | B1 | * | 5/2017 | LeDoux | B60K 15/063 |
| 9,669,706 | B2 | * | 6/2017 | Koukan | B60K 15/035 |

(Continued)

OTHER PUBLICATIONS

Automobile. (n.d.) American Heritage® Dictionary of the English Language, Fifth Edition. Houghton Mifflin Harcourt Publishing Compnay. p. 1, (2011). <https://www.thefreedictionary.com/automobile> (Year: 2011).*

*Primary Examiner* — Anthony R Shumate

(57) ABSTRACT

A system and apparatus for improving ventilation of a fluid system is disclosed herein. An apparatus for improving ventilation of a fluid storage tank includes a hollow member having a sidewall and an opening formed in the sidewall and an air-permeable membrane extending at least partially across the opening. The membrane permits the passage of air across the membrane and restricts the passage of fluid across the membrane.

12 Claims, 4 Drawing Sheets

(56) References Cited

U.S. PATENT DOCUMENTS

| | | | | |
|---|---|---|---|---|
| 2007/0113581 A1* | 5/2007 | Yoshimi | ................. | F25B 13/00 |
| | | | | 62/475 |
| 2007/0190370 A1* | 8/2007 | Jang | ................. | B01D 19/0031 |
| | | | | 429/410 |
| 2011/0100985 A1* | 5/2011 | Tsiberidis | ............. | B60K 13/04 |
| | | | | 220/86.2 |
| 2012/0186677 A1* | 7/2012 | Wetzel | ............ | B60K 15/03519 |
| | | | | 137/624.27 |
| 2013/0101472 A1* | 4/2013 | Lee | ...................... | F01N 3/2066 |
| | | | | 422/168 |
| 2015/0159529 A1* | 6/2015 | Schroeder | ........ | B60K 15/03504 |
| | | | | 96/4 |
| 2015/0314677 A1* | 11/2015 | Booth | ................... | B60K 15/04 |
| | | | | 220/562 |
| 2016/0032805 A1* | 2/2016 | Huang | ................... | F01N 3/208 |
| | | | | 60/274 |
| 2016/0040575 A1* | 2/2016 | Zhang | ................... | F01N 3/208 |
| | | | | 60/274 |
| 2016/0310906 A1* | 10/2016 | Fukada | ................. | B01D 63/02 |

\* cited by examiner

SYSTEM AND APPARATUS TO IMPROVE VENTING AND SPILL MITIGATION FOR TANK

INTRODUCTION

The present invention relates generally to a storage vessel for a fluid, and more specifically, to an apparatus for improving venting and mitigating spills of fluid from the storage vessel.

Automotive applications often include systems in which a supply of fluid is provided to and stored within a tank or vessel. However, fluid spills including spitback or wellback from the tank or vessel may result when insufficient venting is provided during the filling process.

It is desirable to provide a system and apparatus that improves venting and mitigates spilling of fluid from a tank or vessel during the filling process.

SUMMARY

Embodiments according to the present disclosure provide a number of advantages. For example, embodiments according to the present disclosure improve a customer fill experience by reducing or eliminating spitback or wellback conditions at a fluid nozzle entry to a fluid storage system. Additionally, embodiments according to the present disclosure eliminate a separate vent line from fluid storage tank systems, such as, for example and without limitation, diesel exhaust fluid (DEF) systems, by allowing air to vent from the system directly at the fill head via an air-permeable membrane.

In one aspect, a system for improving gaseous venting and mitigating fluid spills from a fluid storage vessel includes a hollow member having a first end, a second end, and a body surface connecting the first end and the second end, the hollow member having at least one opening formed in the body surface, an air-permeable membrane extending at least partially across the at least one opening formed in the body surface of the hollow member, and a sealing member. The membrane permits passage of a gas across the membrane to improve venting of the fluid storage vessel and the seal prevents spillback of fluid during fill operations.

In some aspects, the hollow member is a fill head for a diesel exhaust fluid system.

In some aspects, the sealing member extends at least partially across the first end of the hollow member.

In some aspects, the sealing member extends fully across the first end of the hollow member.

In some aspects, the hollow member has a length between the first end and the second end and the opening extends at least half of the length of the hollow member.

In some aspects, the sealing member permits one-way flow of fluid towards the fluid storage vessel.

In some aspects, the first end of the hollow member and the sealing member are configured to interface with a fill nozzle.

In another aspect, an apparatus for improving ventilation of a fluid storage vessel includes a hollow member having a sidewall and at least one opening formed in the sidewall, and an air-permeable membrane extending at least partially across the at least one opening. The membrane permits the passage of a gas across the membrane and restricts the passage of a fluid across the membrane.

In some aspects, the hollow member further includes a first end and a second end connected to the first end by the sidewall, the at least one opening formed between the first end and the second end, and the first end, the second end, and the sidewall define a passage passing through the hollow member.

In some aspects, the apparatus further includes a sealing member that extends at least partially across the first end of the hollow member.

In some aspects, the second end of the hollow member includes a threaded interface on an interior surface of the hollow member, the threaded interface configured to mesh with a coordinating threaded interface of a component of a fluid storage system.

In some aspects, the component is a fill head of a fluid storage system.

In yet another aspect, an automotive vehicle includes a fluid storage tank, a fluid channel fluidly connected to the storage tank, and a venting system fluidly connected to the storage tank by the fluid channel. The venting system includes a hollow member having a first end, a second end, and a body surface connecting the first end and the second end to define a passage through the hollow member, and an air-permeable membrane extending at least partially across an opening formed in the body surface of the hollow member. The membrane permits air passage across the membrane to improve venting of the fluid storage vessel.

In some aspects, the storage tank is a diesel exhaust fluid storage tank.

In some aspects, the venting system further comprises a sealing member.

In some aspects, the sealing member permits one-way flow of fluid towards the fluid storage vessel and prevents spillback of fluid during fill operations.

In some aspects, the fluid storage tank is a diesel exhaust fluid tank and the venting system is a fill head fluidly connected to the diesel exhaust fluid tank.

BRIEF DESCRIPTION OF THE DRAWINGS

The present disclosure will be described in conjunction with the following figures, wherein like numerals denote like elements.

Figure 1:
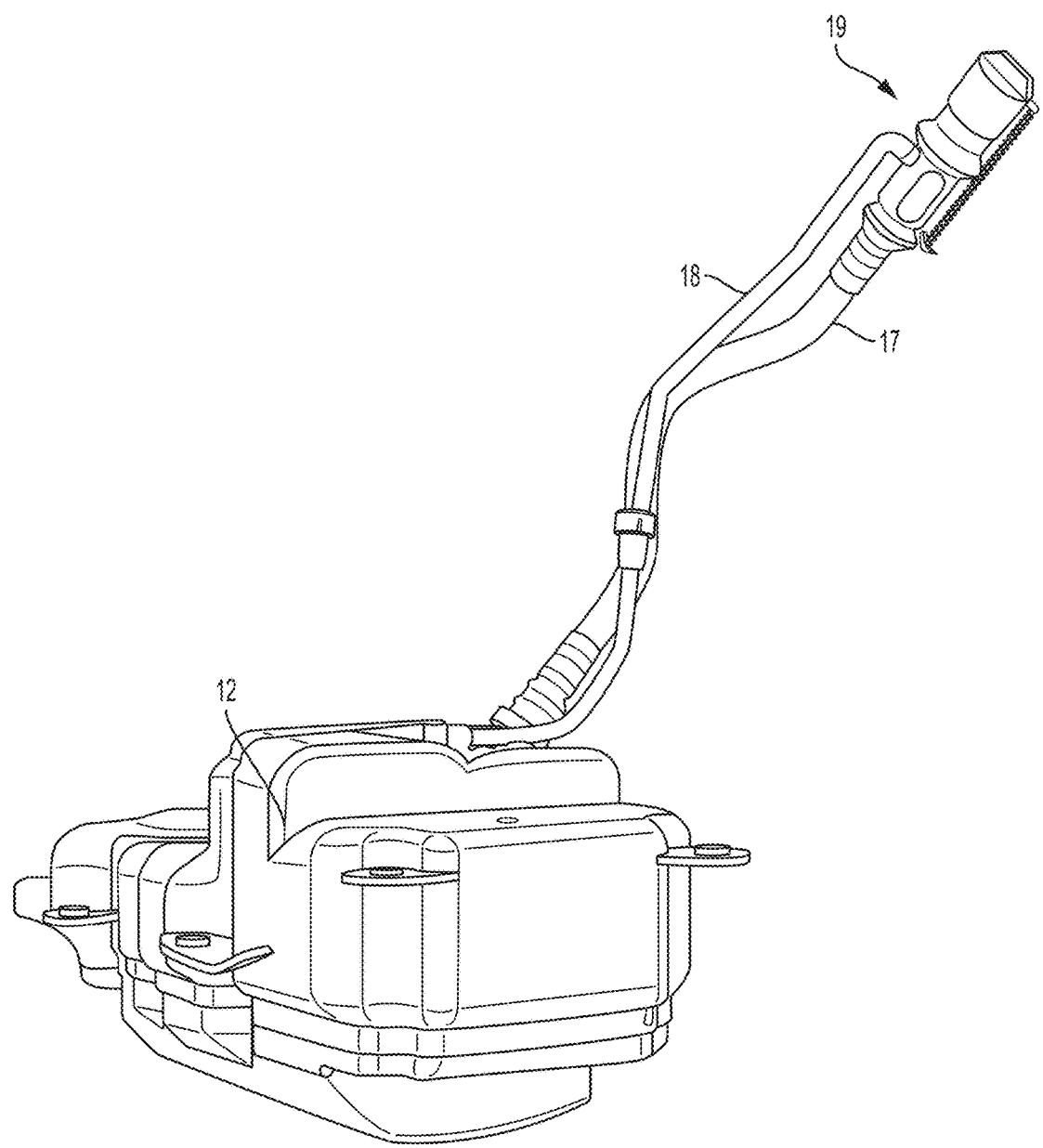
FIG. 1 is a schematic diagram of a fluid storage tank, a fill pipe and a fill head, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first" "second," "third," and so on may be used to describe separate components. Such terminology may include the words specifically mentioned above, derivatives thereof, and words of similar import.

To fill a fluid storage tank, such as for a DEF system, fluid passes through a fill pipe connected to the tank and displaces the air within the tank. The air from the tank is ventilated from the tank via a dedicated vent line or via the fill pipe. To vent air from the tank via the fill pipe, usually a larger diameter fill pipe is used. Use of a wider diameter fill pipe increases manufacturing and installation complexity of the system. Additionally, fluid can often spitback or wellback on the customer during a filling operation, resulting in a negative customer experience.

FIG. 1 illustrates a fluid storage system 10 that may be installed in a vehicle. In some embodiments, the fluid storage system 10 is a diesel exhaust fluid (DEF) system that may be installed in a vehicle having a diesel-type internal combustion engine (not shown). The system 10 includes a fluid storage tank 12 having a fill pipe 17 and fill head 19. In some embodiments, automotive applications that employ DEF systems for the reduction of NOx carry a supply of fluid in the storage tank 12. The fluid may be fluidly connected, via a supply system (not shown) to the exhaust system of the vehicle (not shown). In some embodiments, fluid is transferred to the tank 12 via a fill nozzle (not shown). To fill the tank 12 with fluid, the tank 12 must be able to breathe, that is, release the air held within the tank 12 that is displaced by the entering fluid. In some embodiments, air exits the tank by traveling through the fill pipe 17 and the fill head 19. However, in many embodiments, a large diameter fill pipe 17 is used to effectively release the air through the fill pipe 17 while simultaneously allowing fluid to pass into the tank 12. In some embodiments, as shown in FIG. 1, a separate tube or line that acts as a vent line 18 runs from the tank 12 roughly parallel to the fill pipe 17. The vent line 18 rejoins the fill pipe 17 at the fill head 19 and allows the tank 12 to breathe as the tank 12 is filled with fluid. However, the use of two separate lines to fill and vent the tank increases the complexity of the system and increases the packaging space required for the DEF system 10.

Figure 2:
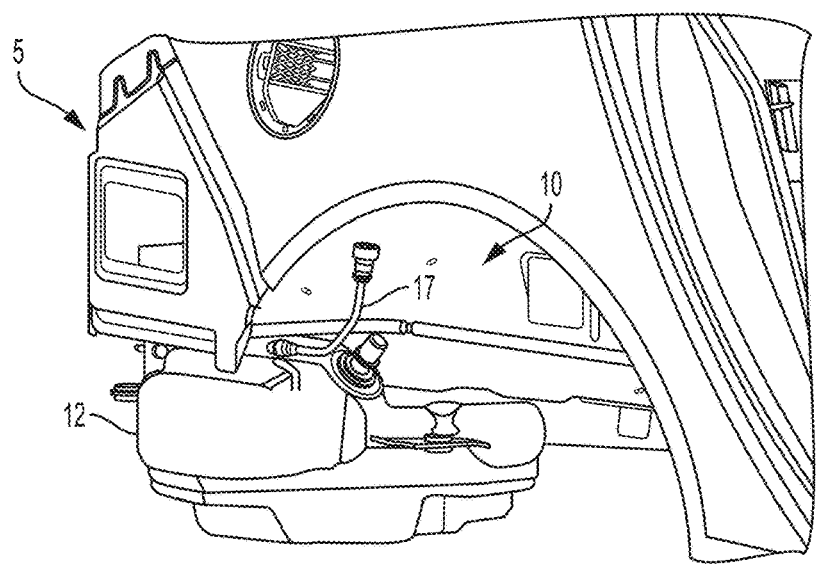
FIG. 2 is a partial schematic view of a vehicle including a fluid storage tank, such as the tank of FIG. 1, according to an embodiment.

Referring now to FIG. 2, in some embodiments, a vehicle 5 includes the DEF system 10, similar to the DEF system 10 shown above. The DEF system 10 includes the storage tank 12 configured to contain fluid. The fill pipe 17 is connected to and extends from the tank 12 for convenient filling by the user. In some embodiments, the fill pipe 17 includes a fill head 19 such as the fill head 19 shown in FIG. 3, to reduce or prevent spillback and/or wellback conditions that may decrease customer satisfaction.

Figure 3:
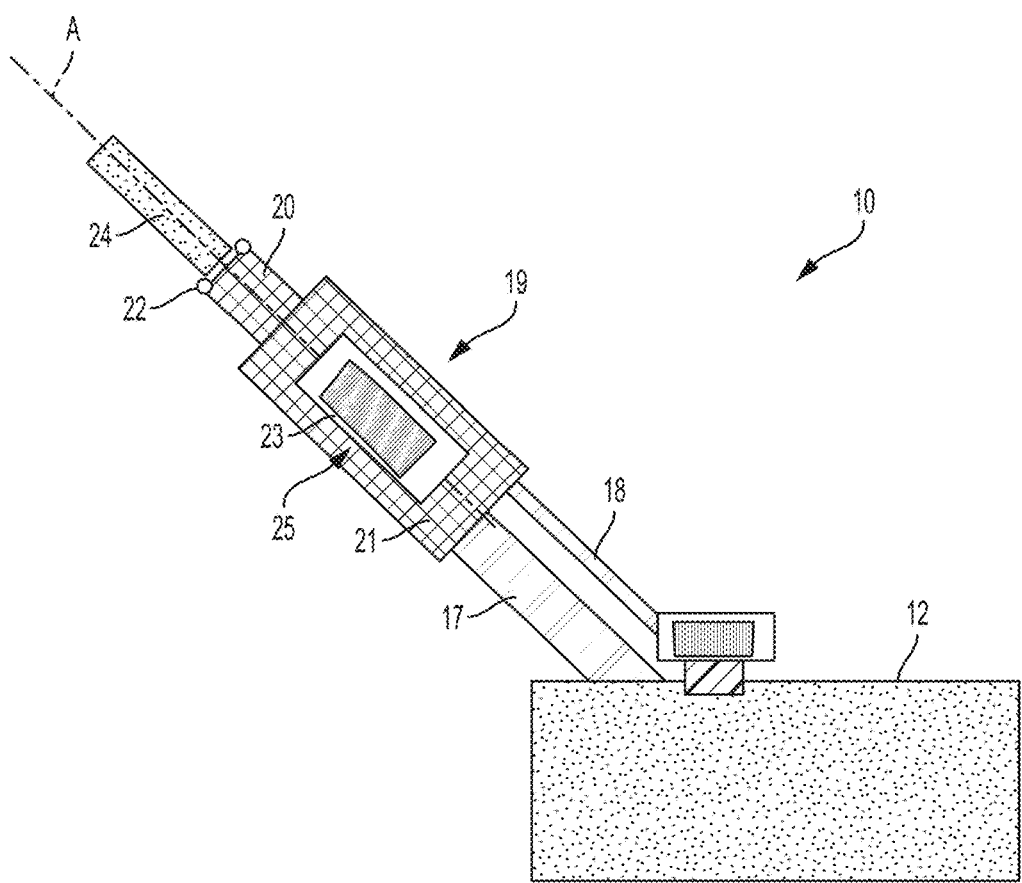
FIG. 3 is a schematic view of a fill head having a vent line, a venting membrane, and a fluid seal, according to an embodiment.

In some embodiments, the fill head 19 shown in FIG. 3 is a hollow member that allows fluid to flow from the fill nozzle 24 to the tank 12 via the fill pipe 17. In some embodiments, the fill head 19 is a hollow cylindrical member. In some embodiments, the fill head 19 is a hollow member of any shape, such as cylindrical, rectangular, etc. The fill head 19 includes, in some embodiments, a fill neck or first portion 20 and a fill head body or second portion 21. In some embodiments, the fill neck 20 has a smaller diameter than the fill head body 21. The fill neck 20 and the fill head body 21 are approximately symmetrical about a longitudinal axis A. The fill neck 20 has a first end and a second end opposite the first end. In some embodiments, a sealing member such as a seal 22 extends radially at least partially across the first end of the fill neck 20. In some embodiments, the seal 22 extends fully across the first end of the fill neck 20. The second end of the fill neck 20 is coupled to the fill head body 21. In some embodiments, the fill neck 20 and the fill head body 21 are unitary. In some embodiments, the fill neck 20 and fill head body 21 are separate pieces joined together by welding, adhesion, or any other mechanical connection means.

In some embodiments, the seal 22 is a sealing interface between the fill neck 20 and the fill nozzle 24. The seal 22 permits fluid to pass from the fill nozzle 24 and through the fill neck 20 while reducing or preventing fluid from passing from the fill neck 20 through the seal 22. In other words, the seal 22 prevents spillback or overflow of fluid during filling operations that may spill onto surrounding components or the user. In some embodiments, the seal 22 is made from a flexible material, such as plastic, rubber, silicone, etc.

As discussed above, the sealing member, such as the seal 22 affixed to the fill neck 20, prevents or reduces fluid spillage from the fill head 19. However, the seal 22 does not allow for ventilation of the tank 12. In some embodiments, the vent line 18 vents the tank 12 to the fill head body 21 of the fill head 19. In some embodiments, the fill head 19 includes at least one opening, such as an opening 25, through a side wall or body surface of the fill head body 21. In some embodiments, the opening 25 extends at least half of the length of the fill head body 21. In some embodiments, the opening 25 is rectangular as shown in FIG. 3. However, in other embodiments, the opening 25 could be oval, circular, square, or any other shape. An air-permeable membrane 23 extends at least partially across the opening 25 both radially and longitudinally and substantially covers the opening 25. The membrane 23 is not fluid permeable, that is, fluid cannot pass through the membrane 23. The membrane 23 allows air to pass through the fill head 19 and escape to the surrounding environment to ventilate the tank 12 during filling operations. In some embodiments, the membrane 23 is a Goretex™ membrane. In some embodiments, the membrane 23 is an air-permeable membrane similar to an air filter that prevents water or other debris from entering the fill head 19.

In some embodiments, the fill head 19, including the seal 22 and the membrane 23, is used in conjunction with the vent line 18. In other embodiments, the fill head 19 includes the seal 22 but does not include the membrane 23 and the fill head 19 with the seal 22 is used in conjunction with the vent line 18. In other embodiments, the fill head 19 includes both the seal 22 and the membrane 23 and is not used in conjunction with the vent line 18, that is, the vent line 18 is eliminated, reducing manufacturing complexity and improving packaging of the DEF system 10. For embodiments including a fill head 19 having both the seal 22 and the membrane 23 that are not used in conjunction with the vent line 18, the fill pipe 17 has a diameter large enough to allow fluid to travel to the tank 12 from the fill nozzle 24 while simultaneously allowing air to pass from the tank 12 to the fill head 19 and through the membrane 23 to the external environment.

Figure 4:
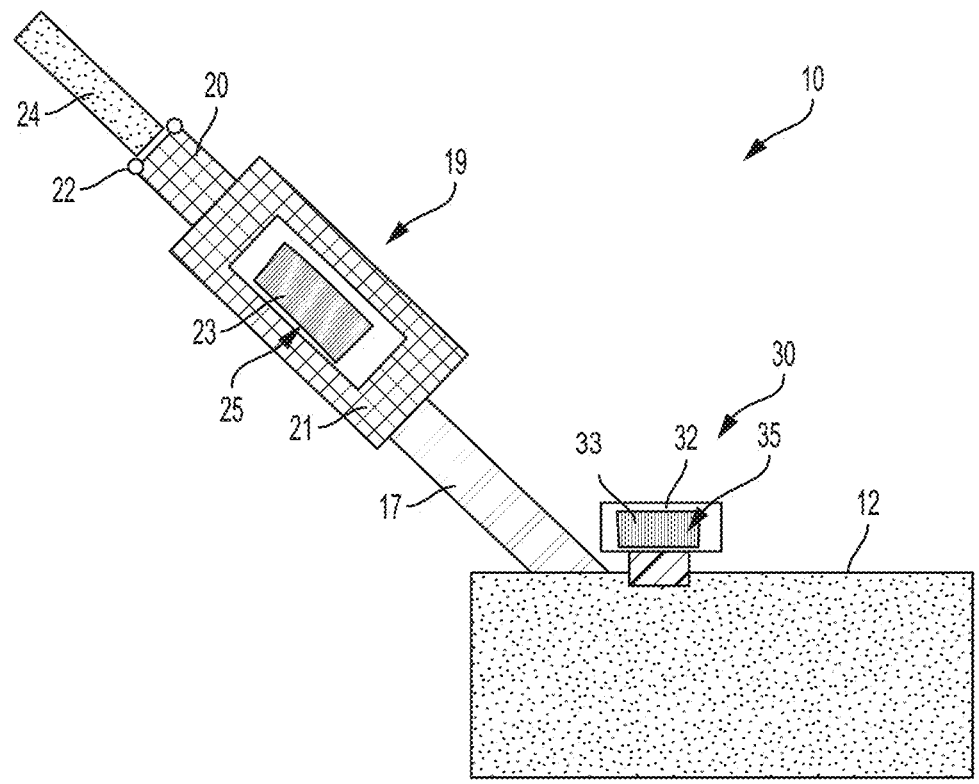
FIG. 4 is a schematic view of a fill head having a venting membrane and a fluid seal, and a tank having a venting membrane, according to an embodiment.

FIG. 4 illustrates another embodiment of the system 10 including the tank 12 and the fill head 19. The fill head 19 includes both the seal 22 and the membrane 23. The fill head 19 is connected to the tank 12 via the fill pipe 17. As discussed above with respect to FIG. 3, the vent line can be eliminated from the system 10 if the fill head 19 includes the breathable membrane 23. Similar to the embodiment discussed above with respect to FIG. 3, the system 10 shown in FIG. 4 ventilates the tank 12 by allowing air to pass through the fill pipe 17 and through the permeable membrane 23 to the external environment. The permeable membrane 23 also prevents water or other debris from the external environment from entering the fill head 19.

In some embodiments, including the embodiment illustrated in FIG. 4, the tank 12 includes a fill limit valve assembly 30. However, the use of a fill limit valve assembly 30 as part of the system 10 is not to be interpreted as limiting, but is representative of one means to ensure automatic fluid nozzle shutoff during refilling the tank 12 of system 10 and to block air flow into the system 10. In other embodiments, any other means to block air flow from the system 10 known to those having skill in the art may be used. The valve assembly 30 includes a head portion 32 that includes an opening 35 covered by an air-permeable membrane 33. In some embodiments, the opening 35 is rectangular as shown in FIG. 4. However, in other embodiments, the opening 35 could be oval, circular, square, or any other shape. The membrane 33 extends at least partially across the opening 35 both radially and laterally to vent the tank 12 and also prevent water or other debris from entering the tank 12. In some embodiments, the system 10 includes the fill head 19 including the breathable membrane 23 and the fill limit valve assembly 30 including the membrane 33. In other embodiments, the tank 12 of the system 10 includes the valve assembly 30 with the breathable membrane 33 and also includes the fill head 10 including the seal 22 but not including the membrane 23. In some embodiments, the system 10 includes both of the membranes 23, 33. In other embodiments, the system 10 includes one or the other of the membranes 23, 33.

Figure 5:
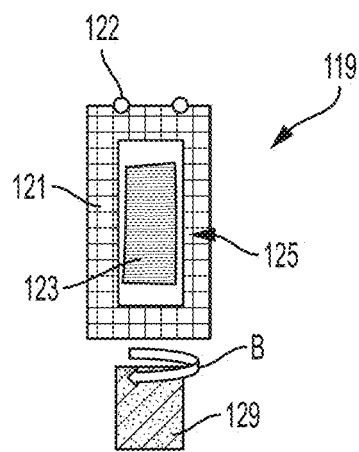
FIG. 5 is a schematic view of a fill head attachment for a fluid storage tank having a venting membrane and a fluid seal, according to an embodiment.

FIG. 5 illustrates an embodiment of a venting member 119 similar to the fill head 19 discussed with reference to FIGS. 3 and 4. The venting member 119 includes a hollow body 121. The body 121 may be a hollow cylindrical member or may have any other hollow shape, such as rectangular, etc. The body 121 has a first end and a second end opposite the first end. A seal 122, similar to the seal 22 discussed with reference to FIGS. 3 and 4, extends at least partially and in some embodiments, completely across the first end of the body 121. The second end of the body 121 includes a threaded interface formed on an interior surface of the hollow body 121. The threaded interface is configured to mesh with a threaded interface of a fill head 129 of a fluid storage system, for example and without limitation. In some embodiments, the venting member 119 couples with the fill head 129 via rotation of the venting member 119 in the direction indicated by arrow B such that the threaded interface of the venting member 119 and the threaded interface of the fill head 129 mesh together.

The body 121 also includes an opening 125 similar to the opening 25 discussed with reference to FIGS. 3 and 4. The opening 125 extends through the sidewall of the hollow body 121 and is at least partially covered by an air-permeable membrane 123. In some embodiments, the opening 125 is rectangular as shown in FIG. 5. However, in other embodiments, the opening 125 could be oval, circular, square, or any other shape. The membrane 123 is similar to the membrane 23 discussed with respect to FIGS. 3 and 4. The membrane 123 permits air to escape to the outside environment while preventing water or other debris from entering the venting member 119.

Figure 6:
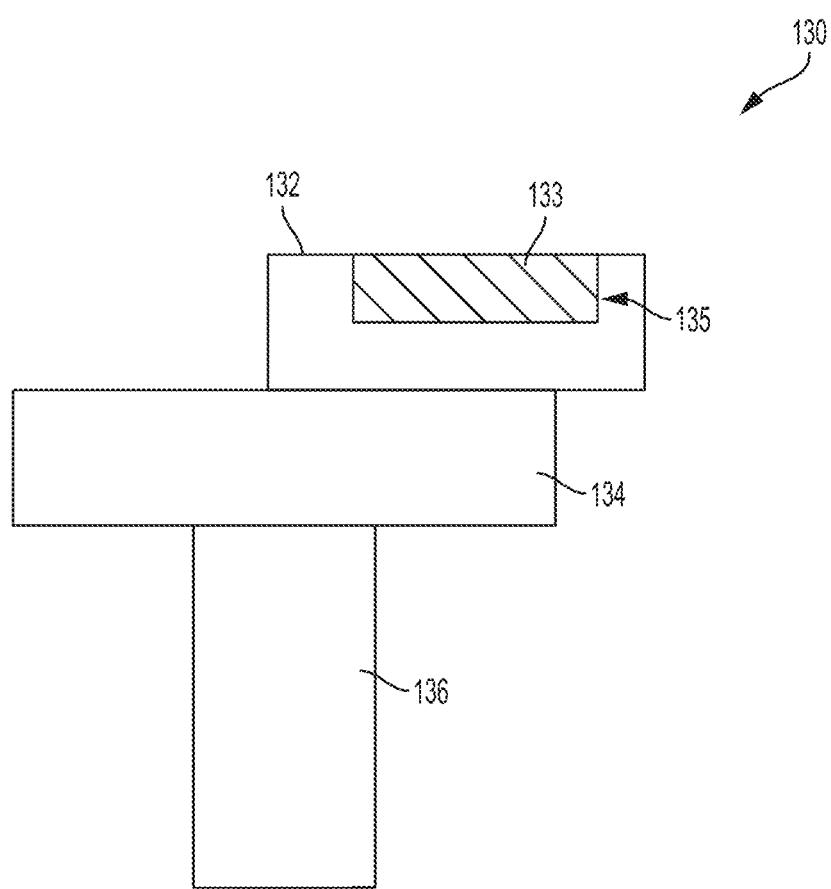
FIG. 6 is a schematic view of a fill limit valve having a venting membrane, according to an embodiment.

FIG. 6 illustrates another embodiment of a fill limit valve assembly 130 that, in some embodiments, is used with a tank, such as the tank 12 discussed herein. The fill limit valve assembly 130 includes a venting member 132, a cap member 134, and a body 136. The body 136 is a hollow member that may have a cylindrical, rectangular, or other shape. The venting member 132 includes an opening 135 similar to the openings 25, 35 discussed herein. The opening 135 allows air to pass from the tank (not shown), via the body 136 and the cap member 134, to the outside environment, to ventilate the tank during filling operations. The opening 135 is at least partially covered by an air-permeable membrane 133, similar to the membranes 23, 33 discussed herein. The air-permeable membrane 133 ventilates the tank by allowing air to exit to the outside environment while simultaneously preventing water or other debris from entering the valve assembly 130.

Additionally, once fluid has reached a fill level, the fluid, along with the air-permeable membrane 133, prevents the ingress of air to a tank (not shown) connected to the valve assembly 130 since the fluid cannot pass through the membrane 133. In some embodiments, a mechanical valve member (not shown) fits within the hollow interior space of the body 136 and acts as a floating valve member to close the valve once fluid has reached the fill level and prevent air flow into the tank (not shown). In some embodiments, the valve assembly 130 is used in conjunction with the fill head 19 or the fill head 119 discussed herein. In some embodiments, the valve assembly 130 is used alone, that is, not in connection with one of the fill heads 19, 119. In some embodiments, the valve assembly 130 is used with any type of fluid storage system including tanks or other fluid storage vessels.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5" "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for improving gaseous venting and mitigating fluid spills from a fluid storage vessel, comprising:
    a hollow member having a first end, a second end, and a body surface connecting the first end and the second end, the hollow member having at least one opening formed in the body surface;
    a permeable membrane extending at least partially across the at least one opening formed in the body surface of the hollow member; and
    a sealing member permitting one-way flow of fluid toward the fluid storage vessel;
    wherein the membrane permits passage of a gas across the membrane to improve venting of the fluid storage vessel, the seal prevents spillback of fluid during fill operations, and the first end of the hollow member and the sealing member are configured to interface with a fill nozzle.

2. The system of claim 1, wherein the hollow member is a fill body for a diesel exhaust fluid system.

3. The system of claim 1, wherein the sealing member extends at least partially across the first end of the hollow member.

4. The system of claim 1, wherein the sealing member extends fully across the first end of the hollow member.

5. The system of claim 1, wherein the hollow member has a length between the first end and the second end and the opening extends at least half of the length of the hollow member.

6. An apparatus for improving ventilation of a fluid storage vessel, comprising:
    a hollow member having a sidewall and at least one opening formed in the sidewall, a first end and a second end connected to the first end by the sidewall, the at least one opening formed between the first end and the second end, and the first end, the second end, and the sidewall defining a passage passing through the hollow member;

a sealing member extending at least partially across the first end of the hollow member; and a permeable membrane extending at least partially across the at least one opening;

wherein the membrane permits the passage of a gas across the membrane and restricts the passage of a fluid across the membrane and the first end of the hollow member and the sealing member are configured to interface with a fill nozzle.

7. The apparatus of claim 6, wherein the second end of the hollow member includes a threaded interface on an interior surface of the hollow member, the threaded interface configured to mesh with a coordinating threaded interface of a component of a fluid storage system.

8. The apparatus of claim 7, wherein the component is a fill head of a fluid storage system.

9. An automotive vehicle, comprising:

a fluid storage tank;

a fluid channel fluidly connected to the storage tank; and a venting system fluidly connected to the storage tank by the fluid channel, the venting system including a hollow member having a first end, a second end, and a body surface connecting the first end and the second end to define a passage through the hollow member;

a sealing member permitting one-way flow of fluid toward the fluid storage tank; and an air-permeable membrane extending at least partially across an opening formed in the body surface of the hollow member;

wherein the membrane permits air passage across the membrane to improve venting of the fluid storage vessel and the first end of the hollow member and the sealing member are configured to interface with a fill nozzle.

10. The automotive vehicle of claim 9, wherein the storage tank is a diesel exhaust fluid storage tank.

11. The automotive vehicle of claim 9, wherein the sealing member prevents spillback of fluid during fill operations.

12. The automotive vehicle of claim 11, wherein the fluid storage tank is a diesel exhaust fluid tank and the hollow member is a fill body fluidly connected to the diesel exhaust fluid tank.

* * * * *